March 23, 1943.  S. BOCHONOK  2,314,761
WATER GAUGE
Filed Sept. 18, 1941

Stefan Bochonok,
INVENTOR.

WITNESSES:

BY
Victor J. Evans & Co.
ATTORNEYS

Patented Mar. 23, 1943

2,314,761

UNITED STATES PATENT OFFICE 2,314,761

WATER GAUGE

Stefan Bochonok, Enola, Pa.

Application September 18, 1941, Serial No. 411,419

3 Claims. (Cl. 73—330)

This invention relates to a water gauge and has for an object to provide a water gauge which will be so constructed as to be easily read by an engineer and a fireman from their respective places in an engine cab, thus enabling a single water gauge to perform the work of two water gauges, for the engineer and fireman, conventionally in use.

A further object is to provide a water gauge which may be read from either side instead of from only directly in front as is necessary with the gauges now in use.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 4:
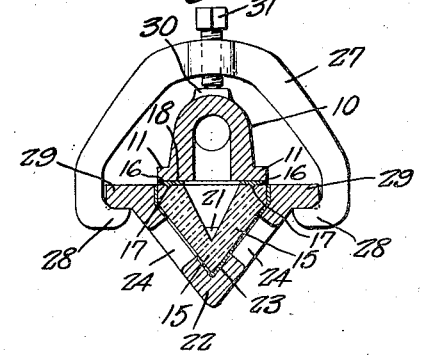
Figure 4 is a cross sectional view of the water gauge.

Referring now to the drawing in which like characters of reference designate similar parts in the various views, 10 designates the casing of the water gauge, the casing being provided with spaced flanges 11 on its open side, see Figure 4. An upper nipple 12 and a lower nipple 13 are threadedly engaged with the respective upper and lower ends of the casing and communicate with the chamber 14 of the casing. The nipples receive the usual fittings.

A sight glass 15, of V-shape in cross section, is disposed in front of the casing 10. The sight glass comprises diverging transparent walls the rear ends of which terminate in flat faces 16 which confront the flanges 11 of the casing and which are provided with grooves 17 into which a portion of a packing 18 is forced when the flat faces 16 are forced toward the flanges 11 of the casing, upon which the packing strip is supported.

Figure 1:
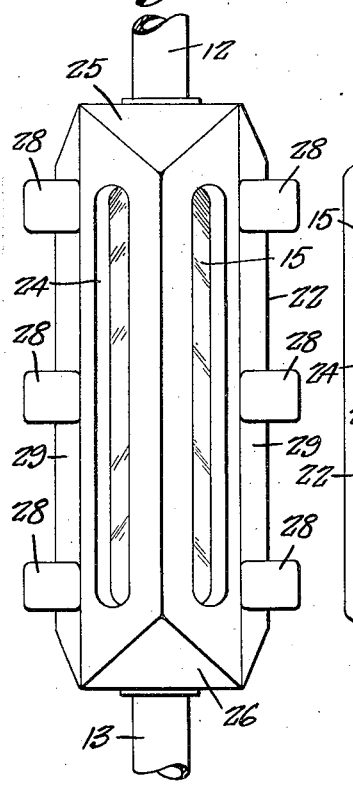
Figure 1 is a front elevation of a water gauge constructed in accordance with the invention.
Figure 2:
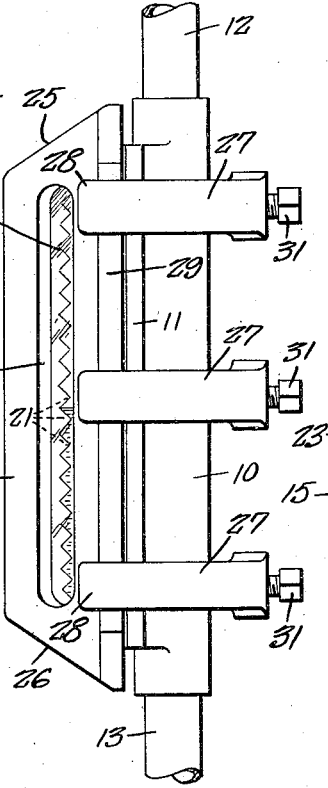
Figure 2 is a side elevation of the water gauge shown in Figure 1.
Figure 3:
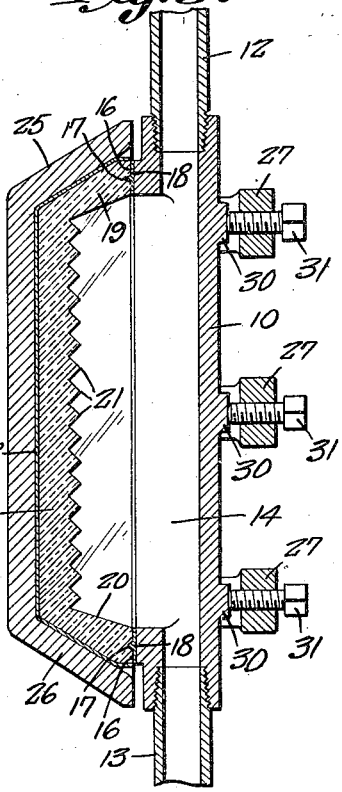
Figure 3 is a longitudinal sectional view of the water gauge.
Figure 5:
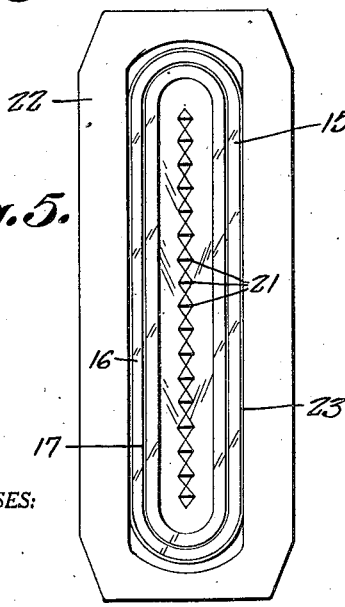
Figure 5 is a rear elevation of the water gauge glass and sight member.

The top and bottom of the sight glass are closed by respective upwardly and downwardly inclined glass walls 19 and 20, see Figure 3, which are integral with the side walls 15. The inner surface of the apex of the V-shaped sight glass is provided with integral teeth 21 which extend transverse thereof, see Figures 3 and 5, which aid in determining the height of the water in the gauge. The transparent glass walls permit light rays to enter into the sight glass and this also aids in noting the height of the water in the glass since the water will be of a different color than the glass, as is customary.

The sight member 22 is also of V-shape in cross section and receives the sight glass, see Figure 4. Interposed between the sight member and the sight glass is a packing strip 23 which prevents injury to the glass by forming a yielding cushion between the sight member and the glass. The sight member is provided in its sides with longitudinal sight openings 24 which expose longitudinal portions of the sight glass and permit the height of the water in the sight glass to be determined from either side of the sight member 22 so that where the water gauge is used on a locomotive, both the engineer and the fireman may view the water level in the water glass without leaving their seats on opposite sides of the cab.

The sight member 22 is closed at the top and at the bottom through the medium of respectively upwardly and downwardly inclined top and bottom walls 25 and 26, see Figure 3. These walls are disposed exteriorly of the top and bottom walls 19 and 20 of the sight glass and it will be noted that the cushion strip 23 extends between the top and bottom walls of the sight member and the corresponding walls of the sight glass. This cushion strip also permits easy removal and replacement of the sight glass when the instrument must be cleaned as is necessary periodically.

In order to secure the sight member and the sight glass in assembled position on the casing a plurality of yokes 27 are disposed astride of the casing 10 and have their free ends extended inwardly toward each other as shown at 28, see Figure 4, to engage over respective lateral flanges 29 formed on the sight member 22. The casing is provided on its rear face with a plurality of bosses 30 against which adjusting screws 31 carried by the yokes are engaged. By backing out the adjusting screws sight glass and sight member will be freed from being pressed by the yokes against the casing so that the parts may be easily disassembled for cleaning, inspection and repairs.

From the above description it is thought that the construction and operation of the invention will be fully understood without further explanation.

What is claimed is:

1. A water gauge, comprising a casing having an open side, a sight glass V-shape in cross section disposed on the open side of the casing and closing the same, a sight member of V-shape in cross section disposed astride of the sight glass and having longitudinal sight openings exposing a greater portion of the side walls of the sight glass, said sight member having laterally disposed flanges in rear of the sight openings, and a plurality of yokes disposed astride of the casing and having hooked ends engaging over said flanges and adjustably held to lock the sight member against the sight glass.

2. A water gauge, comprising a casing having an open side provided with laterally extending flanges, a sight glass V-shape in cross section having inner straight edges engaging the flanges, a sight member V-shape in cross section disposed astride of the sight glass and having longitudinal sight openings exposing a greater portion of the side walls of the sight glass, said sight member having laterally disposed flanges at its inner edge in rear of the sight openings, a plurality of yokes disposed astride of the casing and having hooked ends engaging over said flanges of the sight member, adjusting screws carried by the yokes engaging the casing, and said sight glass at the apex of the opening therein provided with a vertical row of transverse teeth for assisting in determining the water level in the sight glass.

3. A water gauge, comprising a casing having an open side provided with laterally extending flanges, nipples carried by the upper and lower ends of the casing, a sight glass V-shaped in cross section disposed on the open side of the casing with flat faces engaging the flanges of the casing for closing the same, a sight member V-shape in cross section engaging the outer faces of the sight glass and having longitudinal sight openings and closing the greater portion of the side walls of the sight glass, and a plurality of yokes disposed astride of the casing and having hooked ends engaging the edges of the sight member in rear of the sight openings.

STEFAN BOCHONOK.